United States Patent [19]
Cho

[11] Patent Number: 5,846,414
[45] Date of Patent: Dec. 8, 1998

[54] ELECTRONIC SCALE REDUCTION BY ECCENTRICALLY POSITIONED COILS

[75] Inventor: Young I. Cho, Cherry Hill, N.J.

[73] Assignee: Electronic Descaling 2000, Inc., Boothwyn, Pa.

[21] Appl. No.: 736,231

[22] Filed: Oct. 23, 1996

[51] Int. Cl.$^6$ .................................................. B02F 1/48
[52] U.S. Cl. ..................... 210/222; 210/243; 210/695; 204/660
[58] Field of Search ........................... 210/222, 695, 210/243, 748; 335/209; 204/155, 660

[56] References Cited

U.S. PATENT DOCUMENTS

| | | | |
|---|---|---|---|
| 4,892,655 | 1/1990 | Makovec | 210/222 |
| 4,938,875 | 7/1990 | Niessen | 210/222 |
| 5,074,998 | 12/1991 | De Baat Doelman | 210/222 |
| 5,514,283 | 5/1996 | Stefanini | 210/222 |

*Primary Examiner*—David A. Reifsnyder
*Attorney, Agent, or Firm*—Robert S. Lipton, Esq.; Lipton, Weinberger & Husick

[57] ABSTRACT

For producing controlled precipitation in fluid flowing through a pipe, a coil of electric wire is applied to the pipe segment in which this controlled precipitation is to be produced. This coil may be in the form of an induction coil wrapped around the pipe. Or the coil may be of a flat, rectangular spiral form. In any case, the coil is applied in such a way that the center of its curvature does not coincide with the pipe axis. Instead, this center of coil curvature is offset from the pipe axis. Preferably, this offset is approximately equal to the radius of the pipe.

20 Claims, 3 Drawing Sheets

ELECTRONIC SCALE REDUCTION BY ECCENTRICALLY POSITIONED COILS

BACKGROUND OF THE INVENTION

The present invention relates to the reduction and remediation of "scale" formation inside pipes or vessels which carry water or other fluids. More particularly, the invention relates to apparatus and techniques for performing the above-mentioned functions through the use of electronically produced magnetic and electric fields.

Scale formation is a serious problem, both in industry and in residential situations. The reason is that most fresh water in the United States can be regarded as "hard." Hard water contains calcium and other dissolved minerals, such as magnesium, which can and in fact do deposit on the interior of pipes and other vessels carrying this water. In so doing, the deposits restrict flow or reduce vessel capacity. Especially when the water is used in a heat transfer situation (e.g. a boiler), these deposits have the further deleterious effect of reducing the efficiency of the heat transfer. This reduction can be very costly, causing as much as 70% of the overall cost of the heating fuel to be wasted.

One way to cope with this problem has been to remove these scale deposits by procedures such as sand blasting, acid cleaning, or mechanical scraping. However, these procedures generally require at least some disassembly of the equipment in which the scale deposits had formed, with consequent interruption in the operation of that equipment, in addition to the cost of the procedures themselves. In many cases, these drawbacks made such procedures altogether impractical.

It is known that scale formation can also be treated without using such physically invasive procedures.

In particular, it is known to wrap wire into an elongated coil surrounding a segment of the pipe, upstream from the location where the scale deposits would normally form, and to pass a time-varying electric current through that coil. This current creates a time-varying magnetic field inside the pipe. That magnetic field in turn causes induction and this induction produces an effect which, in connection with the present invention, is called "controlled precipitation".

More particularly, in scale formation, supersaturated mineral ions (such as calcium) in the water combine with counter-ions (such as bicarbonate) and then precipitate out of solution and deposit on scale-susceptible surfaces.

One way to counteract the formation of such scale deposits is to control the type of crystal structure resulting from the precipitation mentioned above. For example, calcium carbonate precipitates are capable of assuming two predominant crystal structures. One of these-types floats in solution and can be carried away by the fluid flow; the other type tends to cling to the lateral pipe surfaces and/or to sink to the bottom and hence accumulates to form the undesired deposits.

Controlled precipitation is achieved by forming, upstream of the region of the potential scale deposits, seed crystals of the above-described type which float in solution. These seed crystals cause subsequent mineral carbonate precipitates of the same type to grow around them. These precipitates then pass through the (downstream) region of potential scale deposits without causing the (undesired) formation of such deposits.

As previously noted, a known technique for effecting controlled precipitation involves applying a coil to the above-mentioned upstream portion of the pipe and energizing this coil with a time-varying electric current. This creates a time-varying magnetic field inside the pipe and that field, in turn, causes induction, leading to the desired controlled precipitation.

The configuration of such coils has taken a variety of different forms including for example, those which are the subject of copending U.S. patent application, entitled Electronic Scale Reduction Technique, U.S. application Ser. No. 08/736,230, filed Oct. 23, 1996 now U.S. Pat. No. 5,776,334 which is filed by the same applicant and is assigned to the same Assignee as the present invention.

To applicant's knowledge, a characteristic which all these various coil configurations have had in common is that they lie along a path around the periphery of the pipe which is substantially concentric with the axis of the pipe itself.

Thus, where the coil was formed by a wire wrapped around the periphery of the pipe to form an induction coil, the axis of that coil was concentric with the axis of the pipe. Likewise, where the coil was formed by a flat, rectangular wire spiral (as in the co-filed patent application referenced above), that coil was applied to the pipe periphery so that it defined a curved surface concentric with the pipe axis.

While this represents what might be considered the natural, or logical arrangement, the present applicant has now determined that it is not necessarily the best.

More particularly, applicant has now determined, through experiment supported by theoretical considerations that, in all these prior arrangements, the degree of effectiveness of the scale reduction varied over the cross-section of the pipe, tending to become lower toward its center than toward the wall of the pipe. On the other hand, fluid flow in a pipe is typically faster in the center than at the pipe wall. Thus, the scale reduction tended to be least effective where it was needed most.

To offset this effect, it has been thought necessary to increase the strength of the magnetic field induced inside the pipe. But this in turn required more electric current in the coil and brought into play the current-limiting effect of coil self-inductance.

Accordingly, it is an object of the present invention to lessen the above-described drawbacks of prior art arrangements.

It is another object to minimize these drawbacks.

It is another object to produce a magnetic field within a fluid-carrying pipe which is not lower in the middle of the pipe than at the pipe wall.

BRIEF DESCRIPTION OF THE INVENTION

These and other objects which will appear are achieved in accordance with the present invention as follows.

A coil of electric wire is applied to the pipe segment in which controlled precipitation is to be produced. This coil may take a known form. For example, it may be in the form of an induction coil wrapped around the pipe. As another example, the coil may be of the flat, rectangular spiral form disclosed in the above-referenced application which is being filed simultaneously herewith.

However, in accordance with the present invention, coils of the known forms are not applied to the pipe in the known way, namely concentrically with the axis of the pipe. Rather, they are applied in such a way that the center of their curvature does not coincide with the pipe axis. Instead, this center of coil curvature is offset from the pipe axis. Preferably, this offset is approximately equal to the radius of the pipe.

In that preferred arrangement, the center of coil curvature is located approximately at the pipe wall.

It has been found that, as the center of coil curvature is displaced away from a location which is concentric with the pipe axis and toward the wall of the pipe, the strength of the magnetic field and resulting induction in the middle of the pipe actually increases, relative to its strength near the pipe wall. This relative increase is greatest when, as in the preferred situation described above, the center of coil curvature is approximately at the pipe wall.

BRIEF DESCRIPTION OF THE DRAWINGS

For further details, reference is made to the discussion which follows, in light of the accompanying drawings, wherein.

The same reference numerals are used in all the figures to designate similar elements.

DETAILED DESCRIPTION OF THE INVENTION

Figure 1:
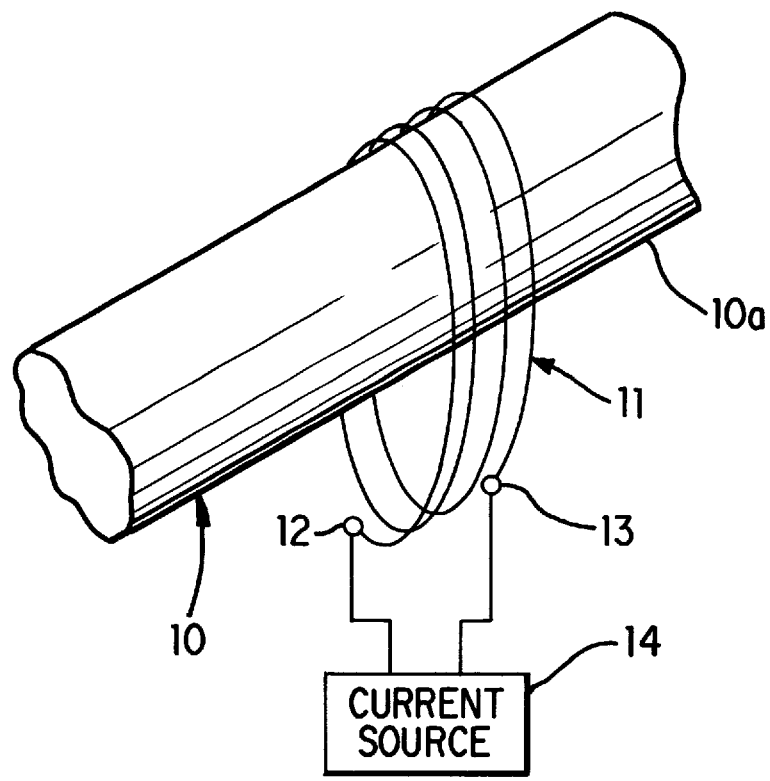
FIG. 1 is a diagrammatic illustration of one embodiment of the invention; using an induction coil wrapped around the pipe segment in which controlled precipitation is to be produced.

Referring to FIG. 1, this shows a segment 10 of a pipe through which flows the fluid to be treated by controlled precipitation.

Wrapped around this pipe segment 10 is an elongated induction coil 11 having ends connected to terminals 12 and 13, respectively. As can be seen in FIG. 1, the center of curvature of this coil 11 is not concentric with the axis of the pipe segment 10. Rather, the coil is wrapped eccentrically around the pipe and specifically in such manner that the center of curvature of the coil is located approximately at the wall 10a of the pipe.

This coil location and configuration can be achieved in practice by forming the coil of wire which, although flexible enough to be wrapped into coil 11, is also rigid enough to retain the shape and the eccentric positional relationship to the axis of pipe 10 which is illustrated in FIG. 1.

The terminals 12 and 13 are used to connect the coil 11 to a source 14 of time-varying electric current. This current then causes coil 11 to induce a time-varying magnetic field in pipe segment 10 which, in turn, produces the desired precipitation in the fluid flowing through that pipe segment 10.

By virtue of the eccentric relationship between coil and pipe, this magnetic field is not only not weaker in the middle of the pipe, but is actually stronger there than at the pipe wall. This is consistent with the fact that the fluid flow tends to be more rapid in the middle of the pipe than at its wall, and therefore benefits from a stronger magnetic field and its accompanying greater controlled precipitation effect.

Figure 2:
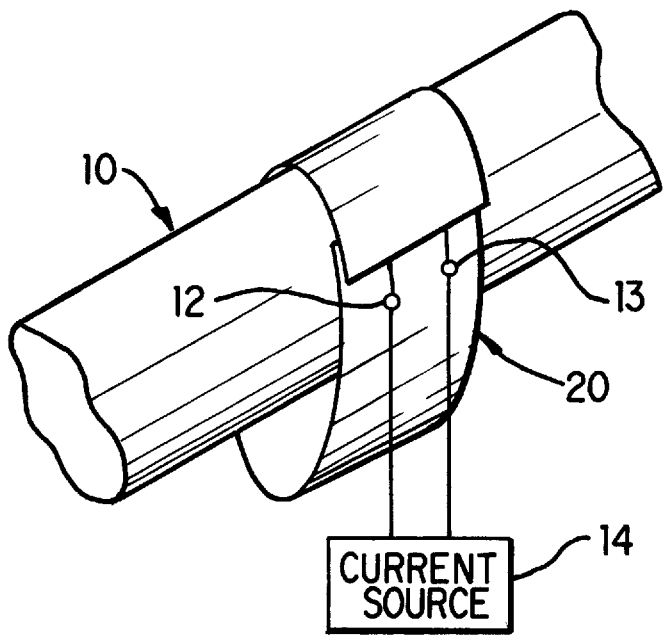
FIG. 2 is a diagrammatic representation of another embodiment of the invention, using a flat, rectangular coil applied to the pipe segment.
Figure 3:
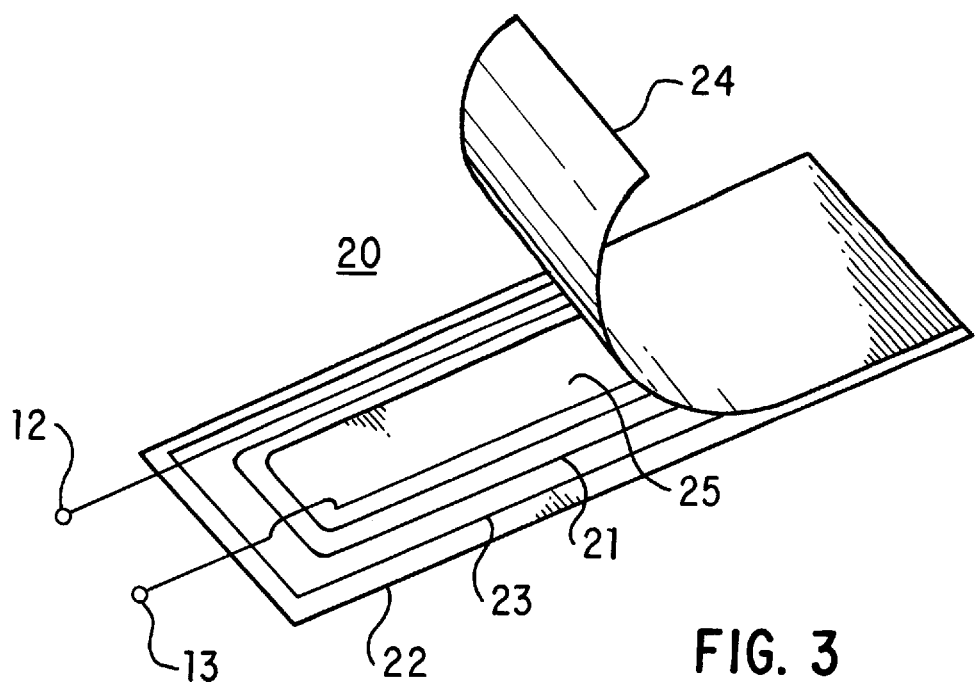
FIG. 3 is a diagrammatic representation of the type of coil used in the embodiment of FIG. 2.

Turning now to FIG. 2, this shows the same pipe segment 10 as in FIG. 1. However, that pipe segment now does not have wrapped around it an elongated induction coil (such as coil 11 in FIG. 1). Rather, in the embodiment of FIG. 2, pipe 10 has applied to it a coil assembly 20 such as illustrated in FIG. 3, to which reference may now be had.

Coil assembly 20 consists of a wire 21, which is formed into a flat, generally rectangular spiral shape. Wire 21 is adhered to a support sheet 22 by means of a tape 23 coated with an adhesive on both sides, and is covered with a protective sheet 24. In FIG. 2, cover sheet 24 is partly peeled back to reveal the wire 21. Thus there is formed a generally rectangular sandwich-like assembly, in which the wire 21 has long straight sides and short straight sides, with a wire-free gap 25 in the middle of the coil, extending lengthwise of that coil.

In accordance with the invention, coil assembly 20 is placed so as to curve around pipe segment 10 in the manner shown in FIG. 2. Thus, it forms a sort of belt around the pipe. This belt is preferably made of such length that its ends overlap and can therefore be attached to each other by adhesive. However, the opposite ends of the coil 21 which forms part of assembly 20 preferably do not overlap.

The overall length of this "belt" (which is determined by the overall length of the assembly 20) is such that the assembly's center of curvature is situated approximately at the wall of pipe 20. The beneficial effect of this eccentric location of the center of curvature is the same as in the embodiment of FIG. 1, namely a stronger magnetic field (and resulting induction) in the middle of the pipe, to correspond to the more rapid fluid flow in that middle.

As will be recognized from the drawing, in so placing the assembly 20, the lengthwise dimension of the rectangular spiral formed by wire 21 (FIG. 3) extends circumferentially around pipe segment 10.

The assembly 20 can be constructed so as to maintain the eccentric configuration shown in FIG. 2 by making the sheets 22 and 24 (FIG. 3) sufficiently flexible to be capable of being bent into the curved shape of FIG. 2, but still sufficiently rigid to also maintain that curved shape once applied to the pipe.

Terminals 12 and 13 are provided at the ends of coil 21 for connection to a current source 14.

Note is taken of the fact that assembly 20 in FIG. 3 has essentially the same construction as an assembly designated by reference numeral 10 in the previously referenced copending patent application entitled Electronic Scale Reduction Technique, U.S. application Ser. No. 08/736,230, filed Oct. 23, 1996 now U.S. Pat. No. 5,776,334. In that co-filed application, details are provided for the dimensions, other parameters and possible structural variations of that assembly. Since these apply equally to assembly 20 of the present application, the contents of said U.S. copending application are incorporated herein by reference, as if set forth at length herein.

Figure 4:
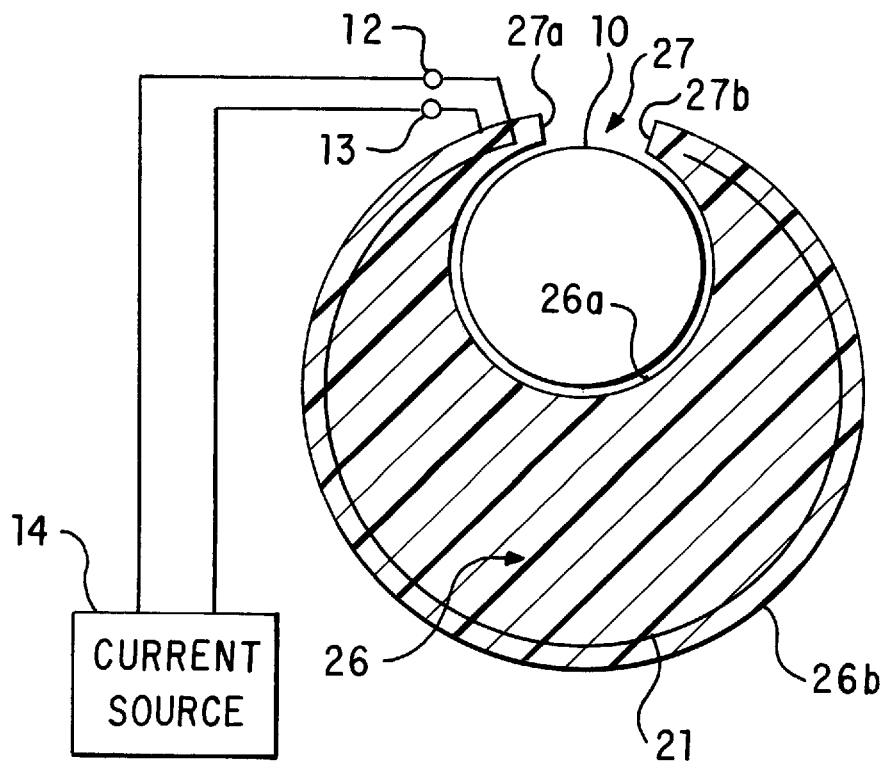
FIG. 4 is a diagrammatic representation of still another embodiment of the invention.

Referring now to FIG. 4, this shows an embodiment of the invention, in which a different way is used to apply a coil such as rectangular spiral coil 21 of FIG. 3 to pipe segment 10. The illustration in FIG. 4 consists of a cross-section taken through pipe 10 at the location of that coil 21. As shown, the coil 21 is molded into a generally cylindrical body 26, which is interrupted at one segment of its circumference by a gap 27 extending lengthwise of the cylinder. At both edges 27a and 27b of that gap 27, the body 26 is relatively thin, and gradually thickens along its circumference until it reaches its greatest thickness at the region 28 of its circumference which is diametrically opposite the gap 27. Preferably, the body 26 has an overall diameter which is approximately twice that of pipe 10.

Body 26 is provided with a recess 26a located adjacent to gap 27 and shaped so as to be capable of being filled by pipe 10. In FIG. 4, recess 26a is shown so filled. Body 26 is preferably made of a somewhat flexible molded material such as rubber. This makes it possible to introduce pipe 10 into recess 26 by sufficiently spreading apart the edges 27a and 27b of gap 27 and slipping the body 26 around pipe 10. Once pipe 10 is seated in recess 26b, the edges 27a and 27b of gap 27 are allowed to resume the positions shown in FIG. 4, whereby the pipe 10 remains retained in recess 26a as shown.

The coil 21 is embedded in body 26 so that it is everywhere close to the outermost surface 26b of the body 26. As a result, coil 11 is positioned relative to pipe 10 in accordance with the present invention, namely with its center of curvature not concentric with the axis of pipe 10. Rather, coil 21 is in its preferred eccentric position, namely with the center of curvature of the coil located substantially at the wall of pipe 10.

Figure 5:
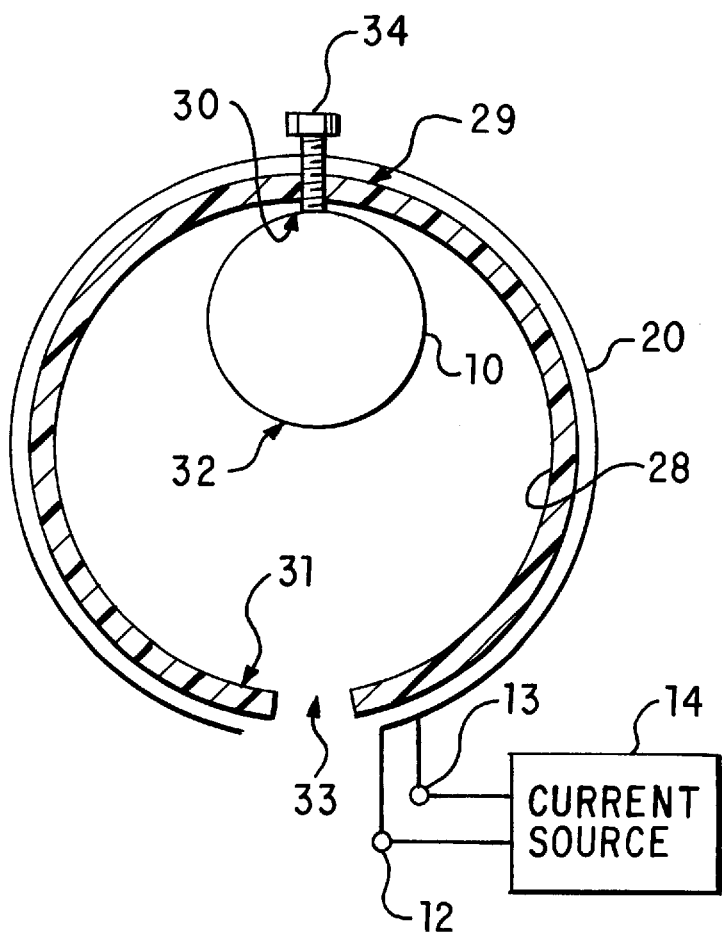
FIG. 5 is a diagrammatic representation of yet another embodiment of the invention.

Referring now to FIG. 5, this shows still another way in which a coil such as rectangular spiral coil 21 of FIG. 3 may be applied to pipe a segment 10. The illustration in FIG. 5 consists of a cross-section taken through such a pipe segment 10 at the location of such a coil 21.

As shown in FIG. 5, the pipe 10 is surrounded by a hollow cylinder 28. This cylinder has a diameter which is substantially twice the diameter of the pipe 10 and it is positioned so that its center of curvature is located substantially at the outer wall of pipe 10.

As a result, in the embodiment shown in FIG. 5, cylinder 28 has a circumferential portion 29 which is essentially adjacent to portion 30 of the circumference of pipe 10, while the portion 31 of cylinder which is diametrically opposite to portion 29 is approximately one whole pipe diameter distant from that portion 32 of pipe 10 which is closest to cylinder portion 31.

Cylinder 28 is preferably made of polyvinyl chloride (PVC) and is provided with a slot, or gap 33 in portion 31, which extends lengthwise along the full length of cylinder 28. This cylinder 28 is preferably made resilient enough, and gap 33 is made wide enough, so that the edges of gap 33 can be spread far enough apart to make it possible to slip the cylinder over pipe 10 and bring it into the position shown in FIG. 5.

To the outer surface of cylinder 28, there is circumferentially attached a coil structure such as that designated by reference numeral 20 in FIG. 3. This coil structure is positioned with the lengthwise dimension of its rectangular spiral coil 21 extending circumferentially around cylinder 28. This (circumferential) dimension of that coil 21 is such that the coil extends essentially from one edge of the gap 33 all the way around cylinder 28 to the opposite edge of the gap 33.

The ends of the coil 21 are brought out to terminals 12 and 13 and connected to current source 14.

To prevent cylinder 28—together with the coil structure 20 which surrounds the cylinder—from shifting with respect to pipe 10, a set screw 34 may be used at location 29 to clamp the cylinder to the pipe.

In all the several embodiments, coil terminals 12 and 13 are shown connected to electric current source 14. This source 14 represents the circuitry which energizes the coil to produce controlled precipitation inside pipe 10. The characteristics and operation of circuitry suitable for this purpose are known and are therefore not further described herein. For example, reference is made for this information to copending U.S. patent application Ser. No. 08/544,156, filed Oct. 17, 1995, now U.S. Pat. No. 5,725,778, issued Mar. 10, 1998. Reference is also made to copending U.S. application Ser. No. 08/544,026, filed Oct. 17, 1995, now U.S. Pat. No. 5,670,041, issued Sep. 23, 1997. Each of these copending applications discloses details of circuitry suitable for use as current source 14. The contents of these copending applications are therefore incorporated in the present specification by reference, as fully as if set forth at length herein.

It will be understood that many variations may be made in the embodiments disclosed herein, without departing from the inventive concept. Accordingly, it is desired to limit that concept only by the appended claims.

What is claimed is:

1. Apparatus for reducing scale formation inside a fluid-flow carrying pipe, the pipe having a generally circularly-shaped wall and a hollow interior passage and having a longitudinal axis substantially parallel to the direction of fluid flow, comprising:

means positioned so as to curve at least partially around a segment of said pipe, for inducing a time-varying magnetic field in said pipe in response to an applied time-varying electric current;

said means being so constructed and arranged that its center longitudinal axis of curvature is not concentric with the longitudinal axis of said pipe segment.

2. The apparatus of claim 1, wherein said center longitudinal axis of curvature approximately coincides with the wall of said pipe segment.

3. The apparatus of claim 1, wherein said means comprises an elongated induction coil wrapped around said pipe segment.

4. The apparatus of claim 1, wherein said means comprises a flat, spiral coil of electrical wire having a general shape of a race track.

5. The apparatus of claim 4, wherein said flat, spiral coil of electrical wire having the general shape of a race track has long, substantially straight sides and short, substantially straight ends.

6. The apparatus of claim 5, wherein the corners formed by said sides and ends are rounded consistently without damaging the electrical wire forming the coil.

7. The apparatus of claim 6, wherein there is a space which is free of said electrical wire, extending lengthwise of the coil between the sides and ends of its innermost turn.

8. The apparatus of claim 7, wherein the electrical wire is embedded in a cylindrical molded body which at least partly surrounds the pipe segment and a longitudinal axis of said cylindrical molded body is not concentric with the longitudinal axis of said pipe segment.

9. The apparatus of claim 8, wherein the axis of the body is located approximately at the wall of the pipe segment.

10. The apparatus of claim 9, wherein the body has a lengthwise gap through which the pipe segment can be introduced into a recess in said body.

11. The apparatus of claim 10, wherein the gap is narrower than the pipe diameter, but the body is sufficiently resilient to enable the gap to be spread open to enable the pipe segment to be introduced into the recess.

12. The apparatus of claim 11, wherein the recess is of substantially the same size and shape as the pipe segment.

13. The apparatus of claim 8 wherein the coil is embedded in the body so as to not be visible from the outer side of the body.

14. The apparatus of claim 7, which further comprises a hollow cylinder surrounding the pipe segment and having a center of curvature which is not concentric with the longitudinal axis of the pipe segment, and the coil conforming to the curvature of the cylinder.

15. The apparatus of claim 14, wherein the diameter of the cylinder is approximately twice the diameter of the pipe segment, and the center longitudinal axis of curvature of the cylinder is substantially at the wall of the pipe segment.

16. The apparatus of claim 15, wherein the cylinder has a lengthwise gap in its circumference, said gap being located diametrically opposite the portion of the cylinder circumference which is nearest the pipe segment, and the coil extending circumferentially around the cylinder from near one edge of the gap to near the opposite edge of the gap.

17. The apparatus of claim 16, wherein the cylinder is made of a resilient material, enabling said gap to be spread open far enough to pass the pipe segment through the spread-open gap.

18. The apparatus of claim 16, further comprising means for securing the cylinder in position with respect to the pipe segment.

19. The apparatus of claim 4, wherein the means comprises an assembly, with the spiral coil of electrical wire inside the assembly.

20. The apparatus of claim 1, further comprising means for applying said time-varying current to said means for inducing said magnetic field.

* * * * *

UNITED STATES PATENT AND TRADEMARK OFFICE
CERTIFICATE OF CORRECTION

PATENT NO. : 5,846,414
DATED : December 8, 1998
INVENTOR(S) : Young Cho

It is certified that error appears in the above-identified patent and that said Letters Patent is hereby corrected as shown below:

Column 6, lines 34-35, delete "wrapped around said pipe segment."

Signed and Sealed this

Fourteenth Day of September, 1999

Attest:

Q. TODD DICKINSON

*Attesting Officer*  *Acting Commissioner of Patents and Trademarks*